US012466555B2

(12) United States Patent
Lawrence et al.

(10) Patent No.: US 12,466,555 B2
(45) Date of Patent: Nov. 11, 2025

(54) APPARATUS AND METHOD FOR MOUNTING A PAYLOAD TO A FLIGHT SYSTEM

(71) Applicant: Triton Systems, Inc., Chelmsford, MA (US)

(72) Inventors: Tyson Lawrence, Highlands Ranch, CO (US); Joshua Frankel, Chelmsford, MA (US); Adam Young, Chelmsford, MA (US); Zachary Carbo, Dupont, WA (US); Michael Steen, Olympia, WA (US); Mathew Gerdes, Shelton, WA (US)

(73) Assignee: Triton Systems, Inc., Chelmsford, MA (US)

( * ) Notice: Subject to any disclaimer, the term of this patent is extended or adjusted under 35 U.S.C. 154(b) by 0 days.

(21) Appl. No.: 18/882,154

(22) Filed: Sep. 11, 2024

(65) Prior Publication Data
US 2025/0083814 A1 Mar. 13, 2025

Related U.S. Application Data

(60) Provisional application No. 63/582,163, filed on Sep. 12, 2023.

(51) Int. Cl.
*B64D 1/00* (2006.01)
(52) U.S. Cl.
CPC ..................................... *B64D 1/00* (2013.01)
(58) Field of Classification Search
CPC ........ B64D 1/00; B64D 17/30; B64D 17/383; B64D 17/025; B60P 3/037
See application file for complete search history.

(56) References Cited

U.S. PATENT DOCUMENTS

| | | | |
|---|---|---|---|
| 2,852,217 A * | 9/1958 | Engelhardt | B64D 17/383 244/151 B |
| 4,189,019 A * | 2/1980 | Zech | B63H 7/02 180/7.4 |
| 4,234,278 A * | 11/1980 | Harshman | B65D 88/14 410/79 |
| 5,593,113 A | 1/1997 | Cox | |
| 5,772,369 A * | 6/1998 | Lerman | B65D 19/44 108/55.5 |
| 6,189,834 B1 | 2/2001 | Dietz et al. | |
| 7,934,683 B2 * | 5/2011 | Hansson | B64D 17/383 244/151 B |
| 8,414,235 B2 * | 4/2013 | Parkinson | B60P 3/073 410/97 |
| 9,205,922 B1 | 12/2015 | Bouwer | |
| 10,029,786 B1 * | 7/2018 | Adams | B64D 17/30 |
| 10,562,621 B2 * | 2/2020 | Witt | B64C 31/036 |

(Continued)

FOREIGN PATENT DOCUMENTS

| | | |
|---|---|---|
| RU | 2764879 C1 | 1/2022 |
| WO | 2012027433 A1 | 3/2012 |

*Primary Examiner* — Joshua D Huson
*Assistant Examiner* — Vicente Rodriguez
(74) *Attorney, Agent, or Firm* — Caldwell Intellectual Property Law

(57) ABSTRACT

An apparatus and method for mounting a payload to a flight system. The apparatus includes a first arm, a second arm, a first member, a second member, and at least four attachment interfaces, attached to at least the payload and the flight system.

25 Claims, 8 Drawing Sheets

(56) References Cited

U.S. PATENT DOCUMENTS

| | | | |
|---|---|---|---|
| 2002/0113165 A1* | 8/2002 | Moshier | B64C 39/026 244/4 A |
| 2012/0009040 A1* | 1/2012 | Parkinson | B65D 19/44 410/96 |
| 2024/0132214 A1 | 4/2024 | Neyedly | |

* cited by examiner

APPARATUS AND METHOD FOR MOUNTING A PAYLOAD TO A FLIGHT SYSTEM

CROSS-REFERENCE TO RELATED APPLICATIONS

This application claims the benefit of priority of U.S. Provisional Patent Application Ser. No. 63/582,163, filed on Sep. 12, 2023, and titled "ERGONOMIC PAYLOAD MOUNTING APPARATUS FOR FLIGHT SYSTEM," which is incorporated by reference herein in its entirety.

GOVERNMENT SUPPORTED RESEARCH

This invention was made with government support under M67854-22-C-6502 awarded by Marine Corps, Department of the Navy, United States Department of Defense. The government has certain rights in the invention.

FIELD OF THE INVENTION

The present invention generally relates to the field of mechanical systems. In particular, the present invention is directed to an apparatus and a method for mounting a payload to a flight system.

BACKGROUND

Flight systems, such as powered paragliders (PPG), are generally not designed to carry significant payloads other than the pilot and the pilot's wearable equipment. Options for stowage and placement are limited for additional payload capacity, particularly for items with non-trivial bulk and weight. Typically, payloads must be carried in front of the pilot to avoid blockage of the propeller intake stream or asymmetric aerodynamics or weight balance.

Prior approaches to payload carrying typically involve attachment of the payload, such as a large personal backpack, to the body of the pilot at the chest opposite the airframe, propulsion, and power system attached by pilot harness to the pilot's back. This creates ergonomic challenges on the ground during launch. The position of the payload limits the ability of the pilot to run during takeoff. Additionally, the payload disrupts the fore/aft balance and the ability of the pilot to check the ground for obstacles during takeoff. During flight, the pilot's neck, shoulders, and lap bear the weight of the payload for the duration of the flight. Furthermore, the payload may continue to affect the fore/aft balance as fuel is consumed during flight and obscure the pilot's field of view.

SUMMARY OF THE DISCLOSURE

Additional prior approaches for payload attachment include: attachment of small payloads to a frame or harness below and/or behind a jumper (i.e., pilot). In these cases payload may be (1) significantly close to propeller increasing a risk of propeller strike; (2) located between jumper's legs and paramotor frame making launches more difficult by hindering leg mobility; (3) affecting a center of gravity of flight system, e.g., moving the center of gravity lower and aftward, making proper thrust alignment on launch more difficult; and (4) inaccessible to pilot during flight.

In an aspect, an apparatus for mounting a payload to a flight system includes at least a first arm comprising a first arm comprising a first end and a second end, wherein the first end of the first arm is configured to attach to the flight system and the second end of the first arm is configured to attach to a proximal end of a first member using a first attachment interface, a second arm comprising a first end and a second end, wherein the first end of the second arm is configured to attach to the flight system and the second end of the second arm is configured to attach to a proximal end of a second member using a second attachment interface, wherein the first arm and the second arm are configured to project substantially horizontally from the flight system, the first member comprising a distal end and the proximal end, wherein the distal end of the first member is configured to attach at a first side of the payload at a third attachment interface, the second member comprising a distal end and the proximal end, wherein the distal end of the second member is configured to attach at a second side of the payload at a fourth attachment interface.

In another aspect, a method for mounting a payload to a flight system includes providing an apparatus for mounting a payload to a flight system, wherein the apparatus comprises at least two members, at least two arms, at least four attachment interfaces, providing a payload, and attaching the payload and the apparatus.

In another aspect an apparatus for mounting a payload to a flight system includes a first arm including a first end and a second end, where the first end of the first arm is configured to attach to the flight system and the second end of the first arm is configured to attach to a proximal end of a first member using a first attachment interface, a second arm including a first end and a second end, where the first end of the second arm is configured to attach to the flight system and the second end of the second arm is configured to attach to a proximal end of a second member using a second attachment interface, where the first arm and the second arm are configured to project at least partially forward along a flight direction from the flight system and the first member and the second member are rigid, the first member includes a distal end and the proximal end, where the distal end of the first member is configured to removably attach at a first side of the payload at a third attachment interface, and the second member includes a distal end and the proximal end, where the distal end of the second member is configured to removably attach at a second side of the payload at a fourth attachment interface, wherein the second side of the payload is opposite the first side of the payload.

In another aspect a method of mounting a payload to a flight system includes providing an apparatus for mounting a payload to a flight system, where the apparatus includes at least two members, at least two arms, and at least four attachment interfaces, providing a payload, removably attaching, using at least two of the at least four attachment interfaces, the payload and the at least two members of the apparatus, and adjusting, using the apparatus, a position of the payload relative to the flight system.

In another aspect an apparatus for mounting a payload to a flight system includes a first member, attached directly or indirectly to the flight system, including a distal end and the proximal end, where the distal end of the first member is configured to removably attach at a first side of the payload at a first attachment interface and a second member, attached directly or indirectly to the flight system, including a distal end and the proximal end, where the distal end of the second member is configured to removably attach at a second side of the payload at a second attachment interface; wherein the second side of the payload is opposite the first side of the payload, the first member and the second member are rigid, and the first member and the second member are configured to project at least partially forward along a flight direction from the flight system.

In another aspect a method of mounting a payload to a flight system, including providing an apparatus for mounting a payload to a flight system, where the apparatus includes at least two members and at least two attachment interfaces, providing a payload, removably attaching, using the at least two attachment interfaces, the payload and the at least two members of the apparatus, and adjusting, using the apparatus, a position of the payload relative to the flight system.

In another aspect an apparatus for mounting a payload to a flight system includes a first member, attached directly or indirectly to the flight system, including a distal end and a proximal end, where the distal end of the first member is configured to removably attach at a payload at a first attachment interface and a first arm comprising a first end and a second end, where the first end of the first arm is configured to attach to the flight system and the second end of the first arm is configured to attach to a proximal end of a first member using a second attachment interface; where the first member is rigid and each of the first member and the first arm are configured to project at least partially forward along a flight direction from the flight system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1A:
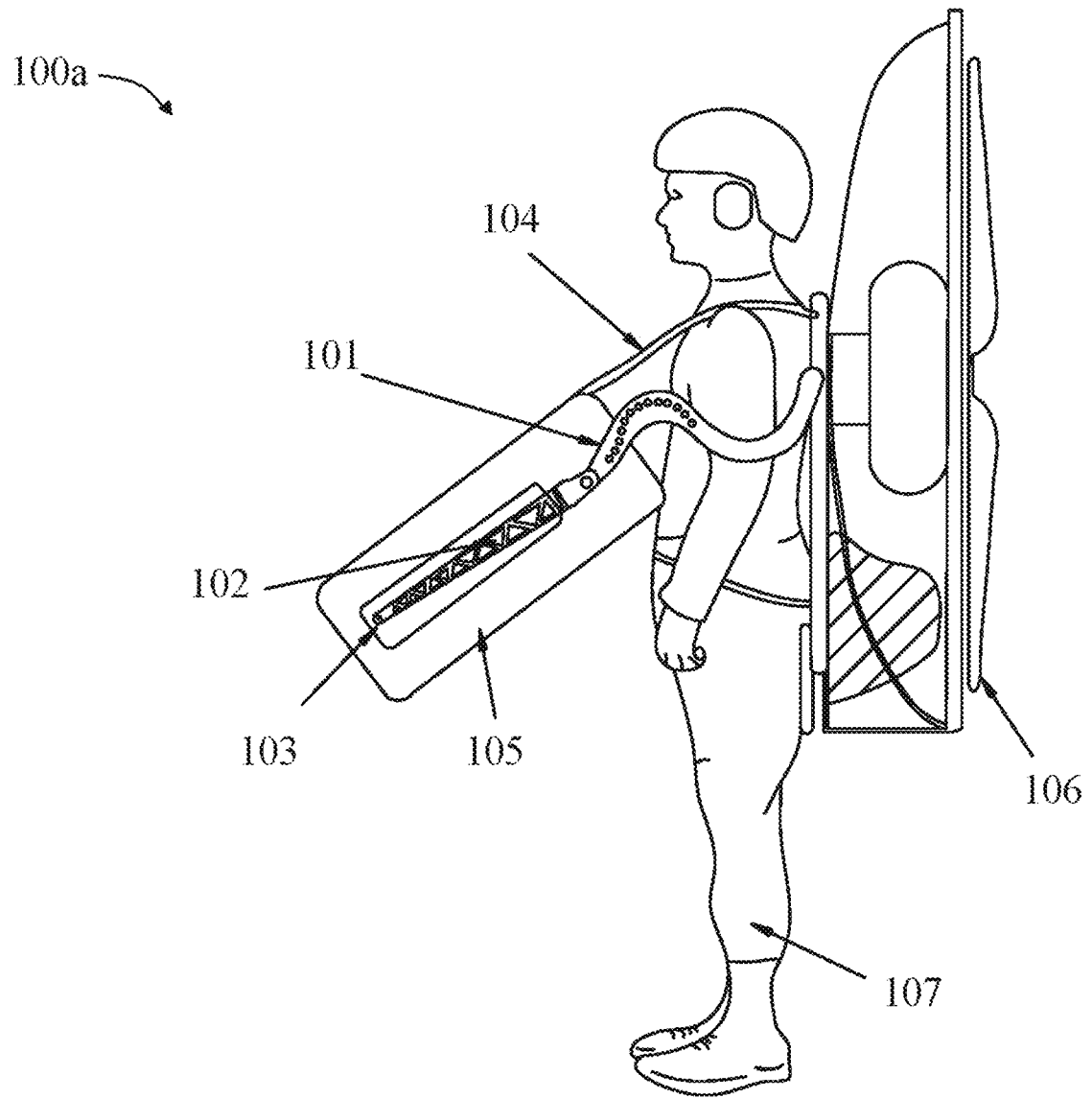
FIG. 1A depicts an illustrative system for mounting a payload on a flight system in accordance with an embodiment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for mounting a payload to a flight system. As used in this disclosure, a "flight system" is any system or device that operates unsupported in air or gas. Flight system may include powered flight systems, such as airplanes, helicopters, unmanned aerial vehicles (UAVs), paramotors, paragliders, and the like. Flight system may also include unpowered flight systems, such as parachutes, gliders, paragliders, and the like. The apparatus includes a first arm comprising a first end and a second end, wherein the first end of the first arm is configured to attach to the flight system and the second end of the first arm is configured to attach to a proximal end of a first member using a first attachment interface, a second arm comprising a first end and a second end, wherein the first end of the second arm is configured to attach to the flight system and the second end of the second arm is configured to attach to a proximal end of a second member using a second attachment interface, wherein the first arm and the second arm are configured to project substantially horizontally from the flight system, the first member comprising a distal end and the proximal end, wherein the distal end of the first member is configured to attach at a first side of the payload at a third attachment interface, the second member comprising a distal end and the proximal end, wherein the distal end of the second member is configured to attach at a second side of the payload at a fourth attachment interface.

There exists a need for an apparatus lor the attachment of the payload in a manner that provides beneficial fore/aft balance against the airframe, propulsion, and power system both on the ground and in flight, does not bear the weight of the payload on the pilot in flight, and moves the payload further from the pilot's face to reduce field of view obstruction.

As used herein, the term "about" when immediately preceding a numerical value means a range of plus or minus 10% of that value, for example, "about 50" means 45 to 55, "about 25,000" means 22,500 to 27,500, etc., unless the context of the disclosure indicates otherwise, or is inconsistent with such an interpretation.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to".

While various compositions, methods, and devices are described in terms of 'comprising" various components or steps (interpreted as meaning "including, but not limited to"), the compositions, methods, and devices can also "consist essentially of" or "consist of" the various components and steps, and such terminology should be interpreted as defining essentially closed member groups.

As used herein, a "fore/aft" means direction towards the front end and the back end of a flight system, respectively. Generally, a front end of a flight system may be proximal a direction of flight of the flight system, and a back end of a flight system may be opposite the front end of the flight system. For example, the fore/aft balance of a flight system refers to balance of weight relative to front end/back end of flight system. Fore/aft balance of a flight system may be partially determined by the weight and positioning of a payload and the airframe, propulsion, and power system. In some embodiments, adjusting the fore/aft balance may be performed by moving a payload closer to or away from the airframe, propulsion, and power system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those skilled in the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.) It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

This disclosure is not limited to the particular systems, devices and methods described, as these may vary. The terminology used in the description is for the purpose of describing the particular versions or embodiments only and is not intended to limit the scope.

Systems can be assembled to aid in the mounting of a payload to a flight system. In some embodiments, the system is configured to attach the payload to an airframe of the flight system. In some embodiments, the system is configured to allow a user to adjust the position of the payload on the ground. In some embodiments, the system is configured to allow a user to adjust the position of the payload during flight. In some embodiments, the system comprises a plurality of arms attached to the flight system and attached to a plurality of members. In some embodiments, the system comprises a plurality of arms attached to the flight system through an attachment interface designed to pivot. In some embodiments, the system comprises a plurality of arms attached to the flight system through a fixed connection.

In some embodiments, the plurality of arms and the plurality of members are attached at an attachment interface which is configured to pivot. In some embodiments, each of the plurality of members is attached at a plurality of attachment interfaces. In some embodiments, each of the plurality of attachment interfaces is attached to the payload. In some embodiments, each of the plurality of attachment interfaces and the plurality of members are configured to adjust to control the fore/aft balance of the flight system. In some embodiments, the system comprises a plurality of straps attached to the flight system and to the payload. In some embodiments, each of the plurality of straps can be adjusted to control the fore/aft balance of the flight system. In some embodiments, each of the plurality of straps contains a release device configured to release the payload from the apparatus.

Referring now to FIG. 1A, an illustration of an apparatus for mounting a payload 105 on to a flight system 106. The apparatus 100a may comprise a first arm 101 and a second arm, a first member 102 and a second member, and a third attachment interface 103 and a fourth attachment interface. In some embodiments, the apparatus 100a may further comprise at least two straps 104.

With continued reference to FIG. 1A, the flight system may include a manned aircraft. As used in this disclosure, a "manned aircraft" is an aircraft that is operated by one or more individuals who are physically present onboard the aircraft during flight. Without limitation, the manned aircraft may include airplanes, helicopters, gliders, and other airborne vehicles, where the pilot or crew members are directly controlling and navigating the aircraft from within. In another non-limiting example, the manned aircraft may include paramotors, ultralights, gyrocopters, small single-engine planes used for recreational flying, foot-launched powered parachutes, wheeled powered parachutes, powered paragliders, paragliders, parachutes, and the like. In another non-limiting example, the manned aircraft may include larger aircrafts like business jets, passenger planes, cargo aircrafts and the like.

With continued reference to FIG. 1A, the flight system may include an unmanned aircraft. As used in this disclosure, an "unmanned aircraft" is an aircraft that is operated without a human pilot onboard. Without limitation, the unmanned aircraft may be controlled remotely by an operator or autonomously by onboard systems and software. Without limitation, the unmanned aircraft may include drones, UAVs (Unmanned Aerial Vehicles), and other similar airborne platforms designed for various applications such as surveillance, delivery, mapping, military operations, and the like.

Still referring to FIG. 1A, the first arm 101 includes a first end and a second end, wherein the first end of the first arm 101 is configured to attach to the flight system 106 and the second end of the first arm is configured to attach to a proximal end of a first member using a first attachment interface. In some embodiments, the first arm 101 is configured to attach to the flight system 106 at one or more of an airframe, a pilot harness, and a canopy rigging. In some embodiments, the second end of the first arm 101 is configured to attach to the first member 102 at a first attachment interface.

With continued reference to FIG. 1A, the second arm includes a first end and a second end, wherein the first end of the second arm is configured to attach to the flight system 106 and the second end of the second arm is configured to attach to a proximal end of a second member using a second attachment interface. In some embodiments, the first end of the second arm is configured to attach to the flight system 106. In some embodiments, the second arm is configured to attach to the flight system 106 at one or more of an airframe, a pilot harness, and a canopy rigging. In some embodiments, the second end of the second arm is configured to attach to the second member at a second attachment interface, wherein the first arm and the second arm are configured to project substantially horizontally from the flight system. For the purposes of this disclosure, an arm may be said to project "substantially horizontally" from an object when, from end to end, the arm covers more horizontal distance than vertical distance. For the purpose of this disclosure, an arm or member is said to project "at least partially forward" from the airframe when an end of the arm or member mounted to the airframe is aft of an opposite end of the arm or member.

The first arm 101 and the second arm may be comprised of any material effective to accommodate the static and dynamic loading experienced by the first member 102 and the second member. In some embodiments, at least one of the first arm 101 and the second arm is comprised of one of aluminum, steel, iron, titanium, carbon fiber, a polymer, a wood, or any other metal, polymer, composite, ceramic, or other structural material(s). In come embodiments, the first arm 101 and second arm may include additional reinforcement geometry, thicker cross-sections, or other such reinforcing features to accommodate the static and dynamic loading through the first member 102 and the second member. In some embodiments, at least one of the first arm 101 and/or the second arm include mechanical features to enable the attachment interface 203 to the first member 102 and/or the second member. These mechanical features comprise of mounting holes, tongue- and groove joints, socket joints, revolute joints, lap joint cutouts, threads, or other such mechanical joint features. In such a case as the modification to the swing arm eliminates attachment points for other system components, such as the harness, or those attachment points are blocked by the position of the member, those attachment points may be replicated elsewhere in swing arm or on the member.

Still referring to FIG. 1A, the first member 102 includes a distal end and the proximal end, wherein the distal end of the first member 102 is configured to attach at a first side of the payload 105 at a third attachment interface. As used in this disclosure, a "distal end" is an end of a member that is positioned away from the flight system, e.g. farthest from the flight system or opposite the flight system. As used in this disclosure, a "proximal end" is the end of a member that is positioned near to the flight system, e.g. nearest to the flight system or adjacent or in contact with the flight system. In some embodiments, the first member 102 is attached to the first arm 101 at the first attachment interface by one of bolts, clamps, adhesives, pins, ratchets, or a sleeve configured to fit around the first arm 101. In some embodiments, the sides of the payload 105 may be positioned opposite each other. Continuing, this means the first side of the payload 105 where the distal end of the first member 102 attaches is on one side of the payload 105, while the second member may attach to an opposite side of the payload 105. Continuing, this arrangement may allow the members to securely hold and balance the payload 105 from opposite sides, enhancing the structural integrity and stability of the payload 105 during flight or operation. Continuing, the opposing sides can ensure that forces exerted on the payload 105 are evenly distributed, reducing the risk of imbalance or improper alignment during the operation of the apparatus.

Still referring to FIG. 1A, the second member includes a distal end and the proximal end, wherein the distal end of the second member is configured to attach at a second side of the payload 105 at a fourth attachment interface. In some embodiments, first side and second side may be on opposite sides of payload from each other. In some embodiments, the second member is attached to the second arm at the second attachment interface by one of bolts, clamps, adhesives, pins, ratchets, or a sleeve configured to fit around the second arm.

In some embodiments, each of the first member 102 and the first arm 101 comprises one or more mounting holes configured to allow the first member 102 to be attached to the first arm 101 at the first attachment interface. In some embodiments, each of the second member and the second arm comprises one or more mounting holes configured to allow the second member to be attached to the second arm at the second attachment interface.

In some embodiments, at least one of the first attachment interface and the second first attachment interface comprises an adjustable pivot point. In some embodiments, the adjustable pivot point is configured to control the angle of the first member 102 and the second member in comparison to the first arm 101 and the second arm. In some embodiments, the adjustable pivot point comprises one or more of pins, clamps, or ratchets. In some embodiments, the adjustable pivot point comprises a vertical slide, multiple pivot points, or a linkage. In some embodiments, the system further comprises one or more of straps, cables, or ropes configured to control the adjustable pivot point. In some embodiments, the adjustable pivot point may be used to control the fore/aft balance of the flight system 106.

The first member 102 and the second member may be comprised of any material effective to accommodate the static and dynamic loading experienced by the first member 102 and the second member. In some embodiments, at least one of the first member 102 and the second member is comprised of one of aluminum, steel, iron, titanium, carbon fiber, a polymer, a wood, or any other metal, polymer, composite, ceramic, or other structural material(s). In some cases, members 102 may be rigid.

The third attachment interface and fourth attachment interface may be comprised of any material effective to accommodate the static and dynamic loading experienced by the third attachment interface and the fourth attachment interface. In some embodiments, at least one of the third attachment interface and the fourth attachment interfaces is comprised of one of aluminum, steel, iron, titanium, carbon fiber, a polymer, a wood, or any other metal, polymer, composite, ceramic, or other structural material(s).

In some embodiments, the first member 102 is configured to be attached at the third attachment interface 103. In some embodiments, the first member 102 and the third attachment interface 103 may comprise a similar shape. In some embodiments, each of the first member 102 and the third attachment interface 103 may comprise a pyramid or cone shape. The use of a similar shape reduces the friction between the first member 102 and the third attachment interface 103 until the first member 102 and the third attachment interface 103 are fully connected in comparison to systems without the use of similar shapes. In some embodiments, the first member 102 and the third attachment interface 103 may have a clearance effective to allow the first member 102 to be inserted into the third attachment interface 103 with minimal resistance. In some embodiments, the first member 102 and the third attachment interface 103 may have a clearance of about 0.5 cm, about 0.6 cm, about 0.7 cm, about 0.8 cm, about 0.9 cm, about 1 cm, about 1.1 cm, about 1.2 cm, about 1.3 cm, about 1.4 cm, about 1.5 cm, about 1.6 cm, about 1.7 cm, about 1.8 cm, about 1.9 cm, about 2.0 cm, or within a range of values between any two of these values.

In some embodiments, the second member is configured to be attached to the fourth attachment interface. In some embodiments, the second member and the fourth attachment interface may comprise a similar shape. In some embodiments, each of the first member 102 and the fourth attachment interface may comprise a pyramid or cone shape. The use of a similar shape reduces the friction between the second member and the fourth attachment interface until the first member 102 and the fourth attachment interface are fully connected in comparison to systems without the use of similar shapes. In some embodiments, the second member and the fourth attachment interface may have a clearance effective to allow the second member to be inserted into the fourth attachment interface with minimal resistance. In some embodiments, the second member and the fourth attachment interface may have a clearance of about 0.5 cm, about 0.6 cm, about 0.7 cm, about 0.8 cm, about 0.9 cm, about 1 cm, about 1.1 cm, about 1.2 cm, about 1.3 cm, about 1.4 cm, about 1.5 cm, about 1.6 cm, about 1.7 cm, about 1.8 cm, about 1.9 cm, about 2.0 cm, or within a range of values between any two of these values.

In some embodiments, at least one of the third attachment interface and the fourth attachment interface are configured to attach to the payload 105 using one of sewing, clips, pockets, hook and loop, adhesives, fasteners, bolts, screws, rivets, hooks, spring detents, or magnets. These attachments may be permanent or configured such that they can be easily removed from the payload, such as in the case of a clip-on attachment to a rucksack that can be removed when not needed. In some embodiments, each of the third attachment interface and the fourth attachment interface comprise mounting holes configured to allow the third attachment interface and the fourth attachment interface to be attached to the payload 105. In some embodiments, each of the third attachment interface and the fourth attachment interface is attached to the payload at a single point. In some embodiments, each of the third attachment interface and the fourth attachment interface is attached to the payload at multiple points. In some embodiments, each of the third attachment interface and the fourth attachment interface is attached to the payload in a continuous fashion. In some embodiments, each of the third attachment interface and the fourth attachment interface is rigidly attached to the payload 105. In some embodiments, each of the third attachment interface and the fourth attachment interface is removably attached to the payload 105, such that the payload may later be removed. In some embodiments, the position on each of the third attachment interface and the fourth attachment interface in relation to the payload 105 is flexible.

In an embodiment, the third attachment interface and the fourth attachment interface may include a spear-scabbard embodiment. For example, without limitation, the payload 105 may include a single linear attachment interface on a first side and a second side of the payload 105 wherein the first side and the second side of the payload 105 are located opposite to each other. In this embodiment, the apparatus 100*a* includes the first member 102 and the second member which may be shaped like spears and positioned on each side of the pilot. Continuing, the spear shaped first member 102 and second member may be insert into a corresponding scabbard-like receptacle on either side of the payload 105. In an embodiment, the spear shaped first member 102 and second member may function as a linear attachment interface that engages with the scabbard, providing two points of connection on each side, one for each spear and one for each scabbard. Continuing, this arrangement aligns may be an embodiment of the third attachment interface and the fourth attachment interface and ensure a secure and balanced connection for the payload 105.

In some embodiments, each of the third attachment interface 103 and the fourth attachment interface comprise an adjusting device configured to control the position of the payload. The adjusting device may be configured to move the third attachment interface 103 or the second attachment interface in relation to the first member 102 or the second member to control the fore/aft balance of the flight system 106. In some embodiments, the adjusting device is configured to be used during flight. In some embodiments, the adjusting device is configured to be used on the ground. In some embodiments, the adjusting device comprises one or more of a ratcheting device, rails, slides, rollers, telescoping rods, linear bearings, adjustable attachment points, rack and pinions, linkages, scissor linkages, 4-bar linkages, pins, balls, or clamps.

In some embodiments, each of the third attachment interface 103 and the fourth attachment interface comprise one or more guide structure. The one or more guide structures may be configured to direct the first member 102 into the third attachment interface 103 or the second member into the second attachment interface. In some embodiments, the one or more guide structures comprise chamfers or bevels.

With continued reference to FIG. 1A, the one or more guided structures may include one or more of chamfers and bevels configured to align the distal end of the first member with a first receptacle coupled to the payload 105, align the distal end of the second member with a second receptacle coupled to the payload 105, engage the distal end of the first member with the first receptacle coupled to the payload 105, and align the distal end of the second member with the second receptacle coupled to the payload 105. In a non-limiting example, the chamfers and bevels may be located at the distal ends of the first and second members, which are configured to interact with corresponding receptacles attached to the payload 105. Without limitation, the chamfers on the distal ends of the first and second members are designed to guide these members into the respective receptacles during assembly or connection, ensuring smooth alignment. Without limitation, the bevels may further assist by reducing friction and creating a taper that leads the distal ends into the receptacles, improving the case and precision of the engagement process. Without limitation, the first member may align with and engage the first receptacle. Without limitation, the second member may similarly align with and engage the second receptacle. Continuing, this system may allow for the secure and accurate attachment of the payload 105 to the flight system 106, enhancing overall stability and functionality.

Still referring to FIG. 1A, the adaptive stabilizer device is attached to at least the payload 105 and the flight system, wherein the adaptive stabilizer device is configured to retain a position of the payload 105 and adjust the position of the payload 105 to maintain a center of gravity of the flight system 106. As used in this disclosure, an "adaptive stabilizer device" is a device designed to retain and adjust the position of a payload. In a non-limiting example, the adaptive stabilizer may be designed to maintain or optimize the center of gravity of the flight system during various phases of flight, such as in response to fuel consumption, load shifts, or aerodynamic changes. Continuing, the adaptive stabilizer device may ensure balanced and stable flight by dynamically compensating for any deviations that could affect the system's stability or performance. In a non-limiting example, an adaptive stabilizer device may be a mechanical, electromechanical, and/or hydraulic device that secures the payload 105 while allowing for dynamic adjustments to maintain the center of gravity of the flight system 106. Continuing, the adaptive stabilizer device may consist of mounting brackets, actuators, and stabilizing arms that connect the payload 105 to the airframe of the flight system 106. Continuing, these stabilizing arms may be designed to extend or adjust along various axes, allowing for movement that compensates for shifts in the center of gravity caused by fuel consumption or external forces during flight. Adaptive stabilizer device may be manually controlled, for instance, by a pilot, or automatically controlled using a controller.

In another non-limiting example, adaptive stabilizer device may include servo motors or hydraulic actuators to apply real-time adjustments, ensuring that the payload 105 position remains balanced. Continuing, sensors may be integrated to monitor shifts in weight distribution, feeding data to a control system that makes automatic adjustments as necessary. Continuing, the adaptive stabilizer device may be out of aluminum alloys for strength and lightness to carbon fiber for enhanced rigidity. Without limitation, the adaptive stabilizer device may be made of titanium due to its durability, and high-strength plastics could be used to reduce weight for non-critical parts.

With continued reference to FIG. 1A, adjusting, using the adaptive stabilizer device, the position of the payload 105 may include translating the position of the payload 105 relative to the flight system 106 and rotating the position of the payload 105 relative to the flight system 106. In a non-limiting example, the adaptive stabilizer device may function as either a manual or an automated system, depending on the application and/or user preferences. Continuing, as a manual device, the adaptive stabilizer device may allow the operator to make adjustments to the payload 105 position by physically repositioning or tuning the stabilizer components before, during, or after flight. Alternatively, the adaptive stabilizer device may be automated, incorporating sensors and actuators to dynamically adjust the payload's position during flight. The automation may help maintain the center of gravity as conditions change, such as fuel consumption or shifts in weight. The adaptive stabilizer device may be used before flight to pre-set the optimal payload position, during flight to continually adapt to changing conditions, and/or after flight for proper stowage or dismounting of the payload 105. Continuing, the flexibility in operation allows the adaptive stabilizer device to accommodate a wide range of operational needs, ensuring balance and stability throughout various phases of flight.

With continued reference to FIG. 1A, the adaptive stabilizer device may include at least two straps 104 attached to the payload 105 and the flight system 106 at one or more of an airframe, a pilot harness, and a canopy rigging. In some embodiments, each of the at least two straps 104 is attached to the flight system 106. In some embodiments, each of the at least two straps 104 is attached to the flight system 106 at one or more of an airframe, a pilot harness, and a canopy rigging. In some embodiments, each of the at least two straps 104 is further attached to one of the third attachment interface 103, the second attachment interface, or the payload 105. In some embodiments, each of the at least two straps 104 comprises a buckle. In some embodiments, each of the at least two straps 104 comprises an adjusting device. In some embodiments, the adjusting device is configured to adjust the length of the at least two straps. The length of each of the at least two straps 104 may be adjusted to control the position of the payload 105 and the fore/aft balance of the flight system 106. In some embodiments, the adjusting device is configured to control the position of the payload 105 during flight. The straps may use various type of buckles and attachments to facilitate length adjustment such as adjustable webbing sliders and strap buckles, ratchets, cam buckles, pin and hole, and other adjustment means, as well as quick and easy attachment and release including side release parachute buckles, quick release mechanisms, rotary center release, twist buckles, push buttons, clips, pins, and other attachments. The straps may be replaced with ropes, cables, rods, or other linear members.

With continued reference to FIG. 1A, each of the at least two straps 104 may include a release device. The release device may be configured to allow a user 107 to release the payload 105 from the apparatus 100a. In some embodiments, the release device is configured to allow the user 107 to release the payload 105 from the apparatus 100a during flight. The release device may also be a single point release that releases the payload through a single action such as pulling a handle or squeezing a lever. Embodiments of this include a single buckle that disconnects multiple straps, or a buckle that disconnects a strap or cord that passes through a loop or plurality of loops and thus disconnects multiple points at once or a single handle that connects to one or more activation cords that activate multiple release mechanisms simultaneously.

In some embodiments, the system further includes at least one member adjusting device. The at least one member adjusting device may be configured to adjust the distance between the first member 102 and the second member. This allows the user 107 to attach the apparatus 100a to payloads 105 of various size. In some embodiments, the system further comprises at least one adjusting device. The at least one adjusting device may be configured to adjust the distance between the third attachment interface 103 and the second attachment interface. This allows the user 107 to attach the apparatus 100a to payloads 105 of various size.

In a non-limiting example, the at least one member adjusting device may include telescoping rods, adjustable clamps, and/or ratcheting mechanisms that permit the user 107 to extend or retract the first member 102, the second member, and/or the attachment interfaces. For example, without limitation, the telescoping rods may enable smooth extension and retraction between the first member 102 and the second member. In another non-limiting example, the ratcheting device may allow fine-tuned adjustments by locking the position of the first member 102 and or the second member securely once the desired length is achieved.

Additionally and or alternatively, the system may incorporate sliding tracks or rails, which may allow for the guided movement of the first member 102 and the second member along a set path, ensuring precise alignment of the payload 105. Continuing, clamps or screws may be used to secure the adjusted position once the appropriate distance is set. In another non-limiting example, quick-release mechanisms or pins may be used to allow for rapid adjustments when needed. Continuing, these components may enable the system to be adaptable, allowing the user 107 to mount payloads 105 of various sizes efficiently.

In some embodiments, the system further includes a mounting point. In some embodiments, the mounting point is a knee pad. In some embodiments, the mounting point is configured to allow the user 107 to mount a personal device on the apparatus 100a. In some embodiments, the personal device is one of a digital device, paper, writing device, or a notepad.

In some embodiments, the system further includes an aerodynamic cover. In some embodiments, the aerodynamic cover is configured to be attached to at least one of the apparatus 100a or the flight system 106. In some embodiments, the aerodynamic cover is configured to cover at least one of the payload 105 or the user 107.

In some embodiments, the system further includes an auxiliary attachment configured to allow the user 107 to carry additional items. In some embodiments, the auxiliary attachment is attached to the flight system 106. In some embodiments, the auxiliary attachment is attached to the apparatus 100a. In some embodiments, the auxiliary attachment is configured to allow the user 107 to carry any item which the user 107 may need during flight. In some embodiments, the auxiliary attachment is configured to allow the user 107 to carry one or more of lights, communication systems, food, water, or weapons. In some embodiments, the auxiliary attachment is configured to allow the user 107 to access the additional items during flight.

In some embodiments, the adaptive stabilizer device is configured to maintain the payload 105 and the first member 102 onto the third attachment interface 103. In some embodiments, the adaptive stabilizer device includes a ratchet mechanism that permits locating and fixing of the position of the third attachment interface 103 along the member 102 while permitting adjustment for center of gravity of the system.

In some embodiments, the adaptive stabilizer device includes an adjustable buckle and straps that permit locating and fixing of the position of the third attachment interface 103 along the member 102 while permitting adjustment for center of gravity of the system.

In some embodiments, the adaptive stabilizer device includes friction clamps that permit locating and fixing of the position of the third attachment interface 103 along the member 102 while permitting adjustment for center of gravity of the system.

In some embodiments, the adaptive stabilizer device includes a friction fit between the member 102 and third attachment interface 103 that permits locating and fixing of the position of the third attachment interface 103 along the member 102 while permitting adjustment for center of gravity of the system.

In some embodiments, the adaptive stabilizer device includes a pin mechanism through the third attachment interface 103 and member 102 that permits locating and fixing of the position of the third attachment interface 103 along the member 102 while permitting adjustment for center of gravity of the system.

In some embodiments, the payload 105, third attachment interface 103, and members 102 and other components may be covered with a cover. The cover may be made from fabric, plastic, or other flexible material to improve aerodynamics, provide weather protection, reduce snag hazards, provide warmth, or other purpose. Flexible attachments including snubbers, rubber bearings, shock mounts, or other elastic attachment between components may be of value to increase robustness and decrease shock.

Figure 1B:
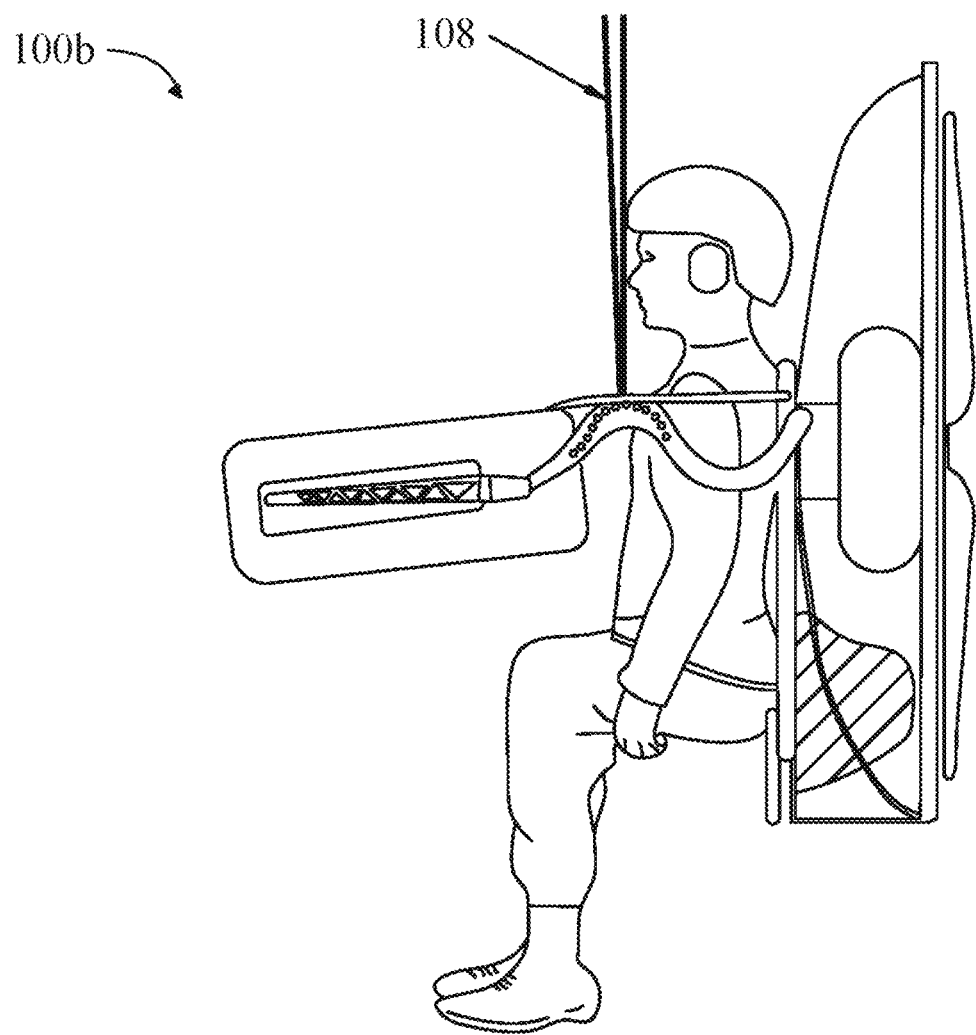
FIG. 1B depicts an illustrative system for a mounted payload on a flight system in accordance with an embodiment.

Referring now to FIG. 1B, an illustration of a system 100b for a mounted payload on a flight system. The system 100b includes a first arm and a second arm operable connected to a flight system at an airframe and a canopy rigging 108. The system depicts a mounted payload adjusted to not obstruct the legs of the user during flight. The system depicts a mounted payload adjusted to not obstruct the view of the user.

Figure 2A:
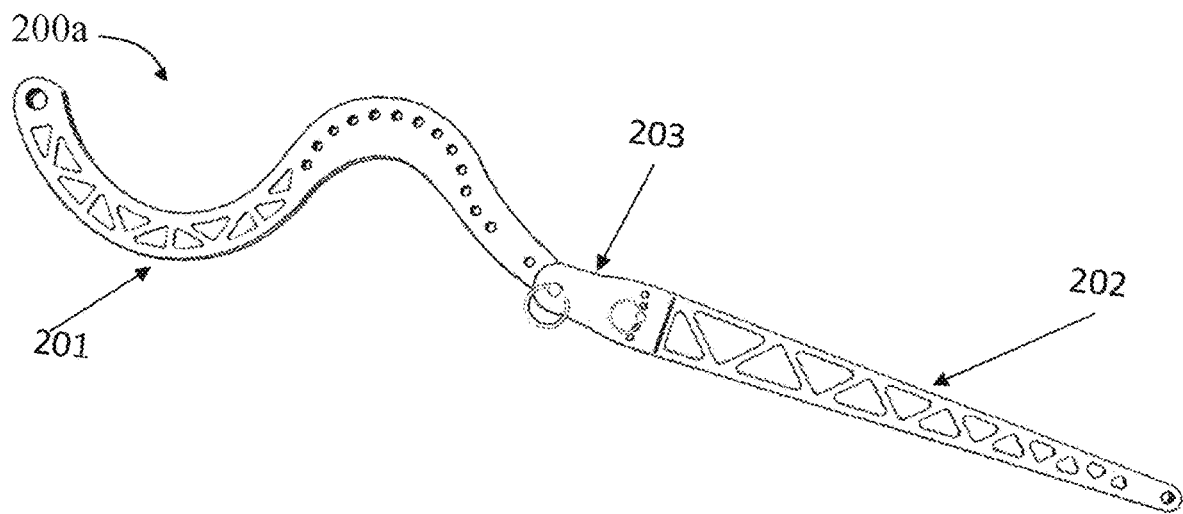
FIG. 2A depicts an illustrative system comprising an arm and a member in accordance with an embodiment.

Referring now to FIG. 2A, an illustration 200a of a system comprising an arm 201 and a member 202. In some embodiments, the arm 201 has an S-shape. In some embodiments, the arm 201 is attached to the member 202 at an attachment interface 203. In some embodiments, the angle of the member 202 in relation to the arm 201 can be adjusted using the attachment interface 203. The attachment interface 203 may comprise one of bolts, clamps, adhesives, pins, ratchets, or a sleeve configured to fit around the arm 201. In some embodiments, the attachment interface 203 includes an adjustable pivot point. In some embodiments, the adjustable pivot point is configured to control the angle of the member 202 in relation to the arm 201. In some embodiments, the adjustable pivot point includes one or more of pins, clamps, or ratchets. In some embodiments, the adjustable pivot point includes a vertical slide, multiple pivot points, or a linkage. In some embodiments, the system further includes one or more of straps, cables, or ropes configured to control the adjustable pivot point. In some embodiments, the adjustable pivot point may be used to control the fore/aft balance of the flight system.

With continued reference to FIG. 2A, without limitation, the angle of the member 202 in relation to the arm 201 may be adjusted using a plurality of arm holes on the arm 201 and a member hole on the member 202. Without limitation, the arm 201 may have a series of spaced holes along its length, allowing for flexible positioning of the member 202. Continuing, the member 202 may include a single hole that may align with any of the plurality of holes on the arm 201. Continuing, by selectively aligning and securing the member 202 to different holes along the arm 201, the user may adjust both the angle and the distance between the member 202 and the arm 201. Without limitation, this configuration may provide flexibility in positioning the payload or adjusting the apparatus for different operational needs or payload sizes, allowing precise control over the orientation and attachment of the system.

Figure 2B:
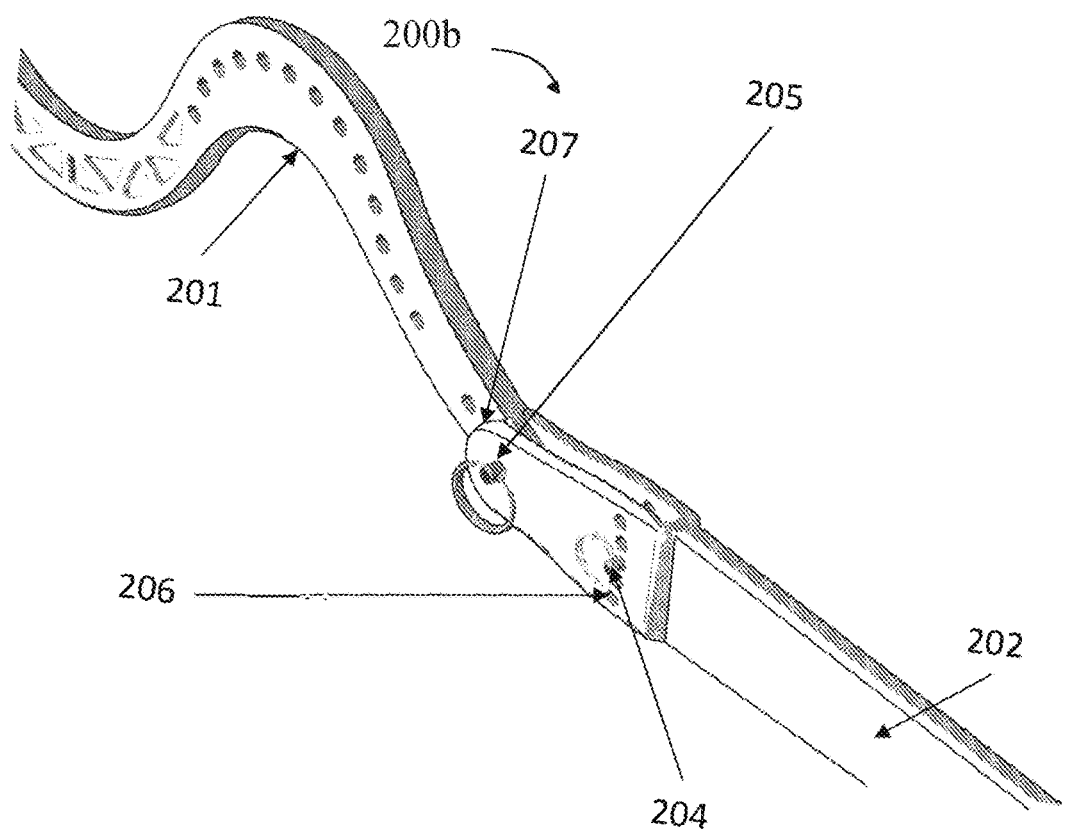
FIG. 2B depicts an illustrative system for attachment interface of an arm and a member in accordance with an embodiment.

Referring now to FIG. 2B, an illustration 200b of a system for attachment interface 203 of an arm 201 and a member 202. The system includes an adjustable pivot point 207 configured to allow the angle of the member 202 to be adjusted in relation to the arm 201. In some embodiments, each of the arm and the member 202 have a first mounting hole configured to allow a first mounting device 205 to be inserted into the arm 201 and the member 202 at the adjustable pivot point 207. In some embodiments, the arm 201 includes a second mounting hole. In some embodiments, the member includes a plurality of second mounting holes 206. In some embodiments, the system includes a second mounting device 204 configured to attach the second mounting hole of the arm 201 and one of the pluralities of second mounting holes 206 of the member 202. In some embodiments, the user may adjust which of the plurality of second mounting holes 206 is used to attach the arm 201 to the member 202 to control the angle of the member 202 in relation to the arm 201.

Figure 2C:
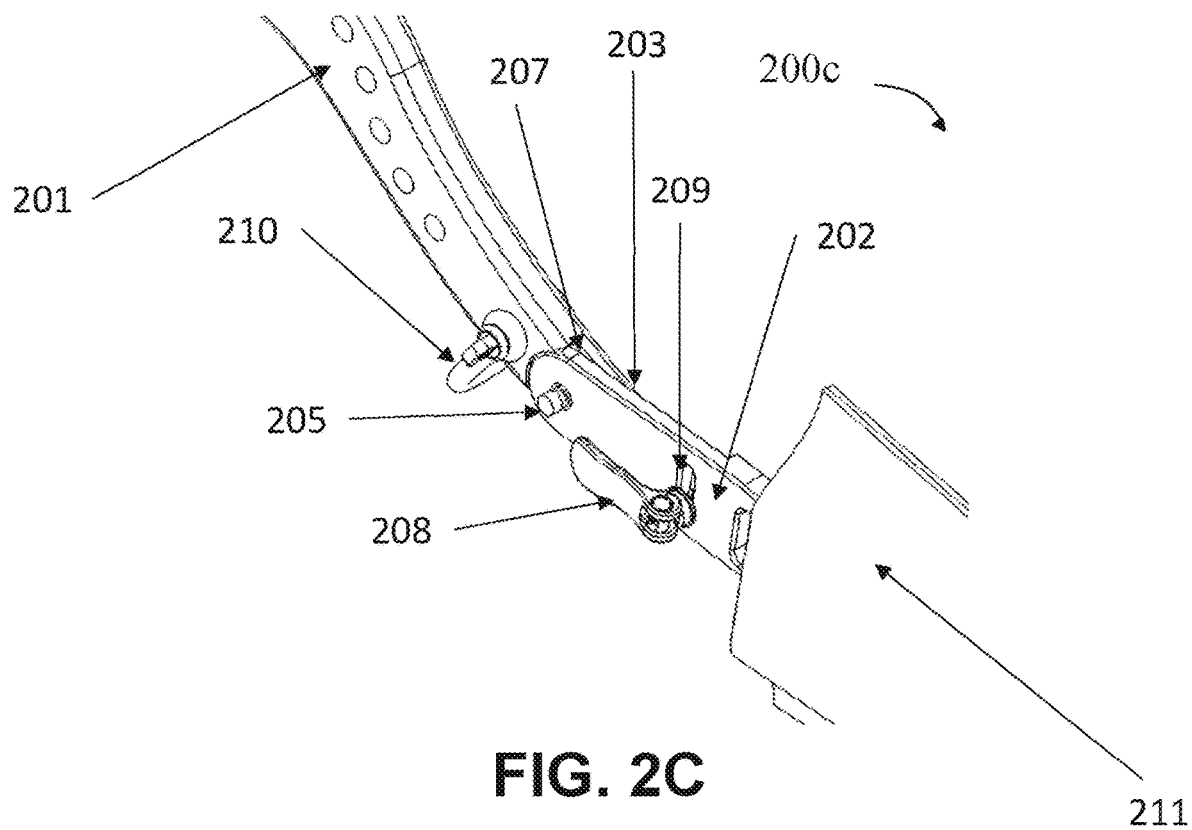
FIG. 2C depicts an illustrative system for attachment interface of an arm and a member in accordance with an embodiment.

Referring now to FIG. 2C, an illustration 200c of a system for attachment interface 203 of an arm 201 and a member 202. The system includes an adjustable pivot point 207 configured to allow the angle of the member 202 to be adjusted in relation to the arm 201. In some embodiments, each of the arm 201 and the member 202 have a first mounting hole configured to allow a first mounting device 205 to be inserted into the arm 201 and the member 202 at the adjustable pivot point 207. In some embodiments, the arm 201 includes a second mounting hole. In some embodiments, the member 202 includes a mounting slot 209. In some embodiments, the system includes a second mounting device 208 configured to attach the second mounting hole of the arm 201 and the mounting slot 209 of the member 202. In some embodiments, the user may adjust where in the slot 209 to attach the arm 201 to the member 202 to control the angle of the member 202 in relation to the arm 201. In an embodiment, a shackle 210 may be used to attach to the seat of the pilot harness. In an embodiment, the shackle 210 is located near the attachment interface 203 on the arm 201. In some embodiments, the member 202 is attached into the attachment interface 211.

Figure 2D:
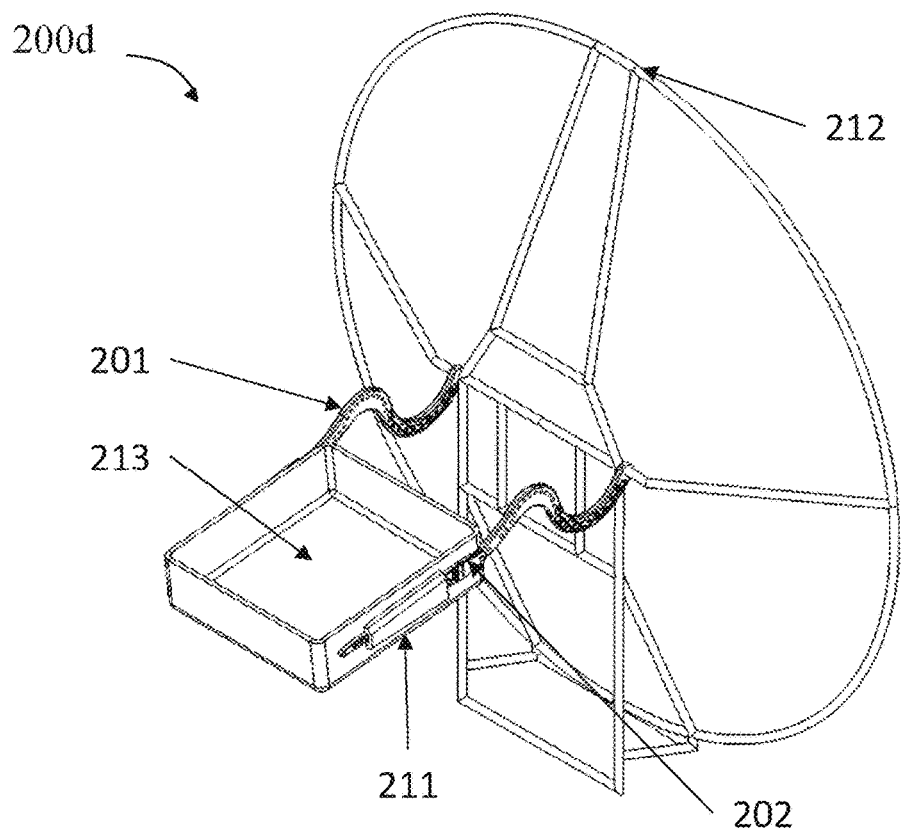
FIG. 2D depicts an illustrative system comprising an arm, a member, and a payload carriage component attached to a paramotor frame in accordance with an embodiment.

Referring now to FIG. 2D, an illustration 200d of a system for attachment of the arms 201 and the members 202 to an illustrative paramotor frame 212. In some embodiments, the payload 213 may be a box, case, container, bag, tray, frame, package, or other object attached to one or more attachment interfaces 211 The attachment interfaces 211 are attached to the members 202.

Figure 2E:
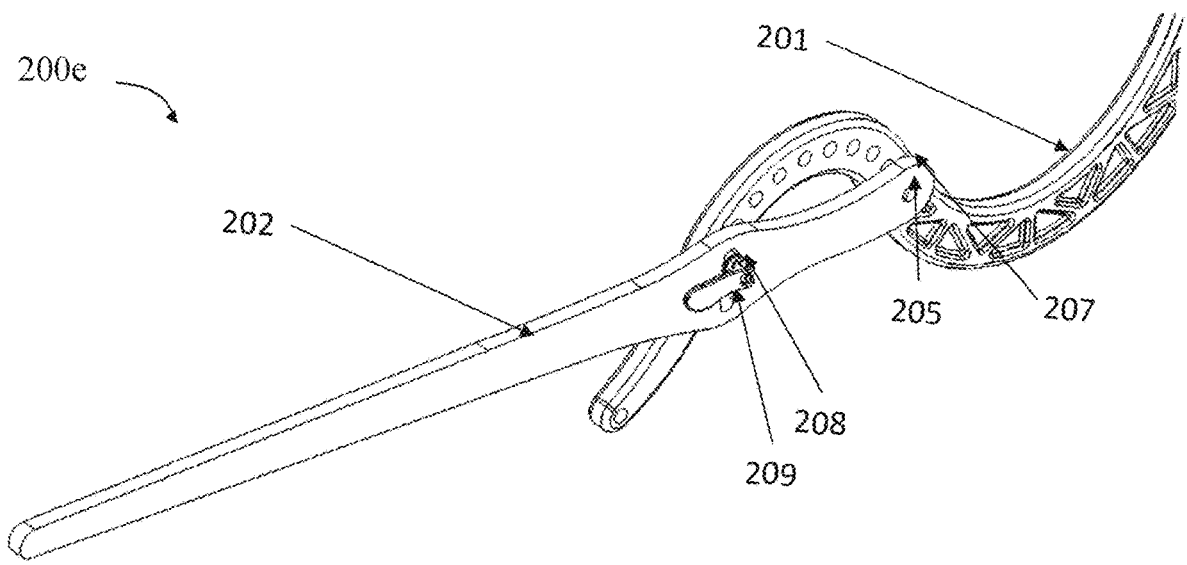
FIG. 2E depicts an illustrative system for an attachment interface of an arm and a member in accordance with an embodiment.

Referring now to FIG. 2E, an illustration 200e of a system for attachment interface of an arm 201 and a member 202. In some embodiments, the member 202 may be attached in a configuration different from that illustrated in FIG. 2A, FIG. 2B, FIG. 2C, and/or FIG. 2D. The system includes an adjustable pivot point 207 configured to allow the angle of the member 202 to be adjusted in relation to the arm 201. In some embodiments, each of the arm 201 and the member 202 have a first mounting hole configured to allow a first mounting device 205 to be inserted into the arm 201 and the member 202 at the adjustable pivot point 207. In some embodiments, the arm 201 includes a second mounting hole. In some embodiments, the member 202 includes a mounting slot 209. In some embodiments, the system includes a second mounting device 208 configured to attach the second mounting hole of the arm 201 and the mounting slot 209 of the member 202. In some embodiments, the user may adjust where in the slot 209 to attach the arm 201 to the member 202 to control the angle of the member 202 in relation to the arm 201.

Figure 2F:
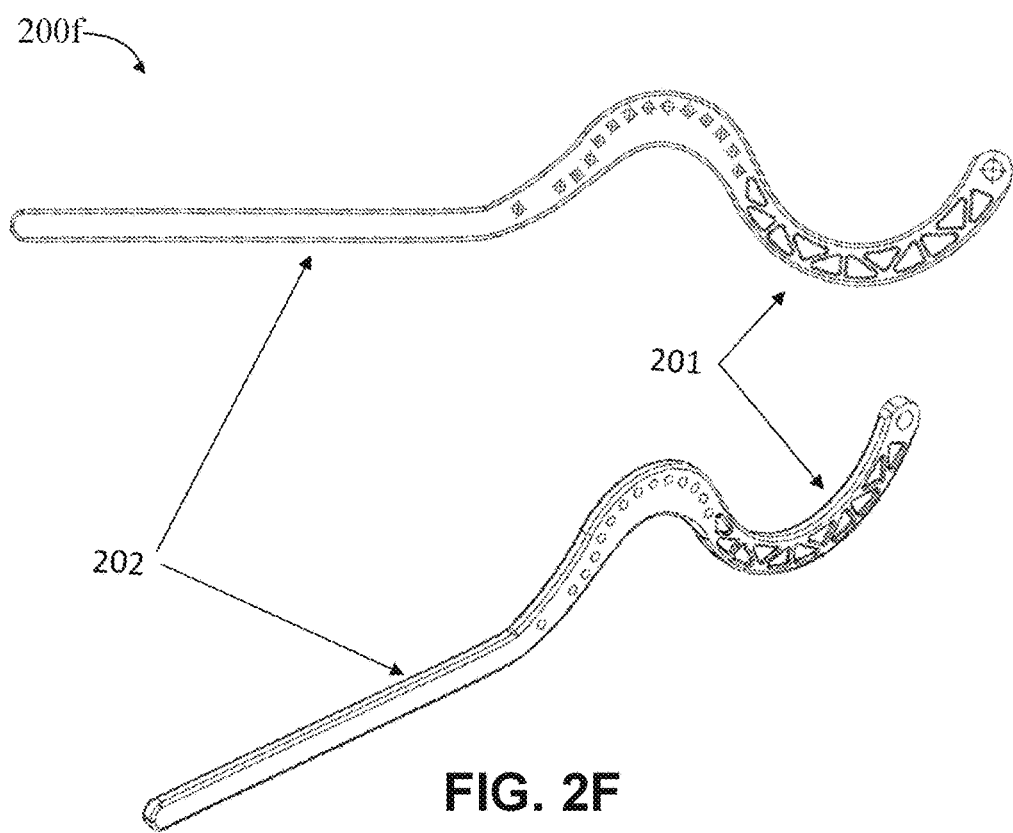
FIG. 2F depicts an illustrative system of an arm and a member as a single component in accordance with an embodiment.

Referring now to FIG. 2F, an illustration 200f of a system wherein arm 201 and member 202 are a single mechanical piece. In some embodiments, the system is fabricated as a single component without mechanical joints between arm 201 and member 202. In some embodiments, the system is fabricated by manner of permanent and/or semi-permanent fixturing of arm 201 to member 202 such as welding, gluing, bonding, brazing, soldering, or other methods of mechanical joinery.

Figure 2G:
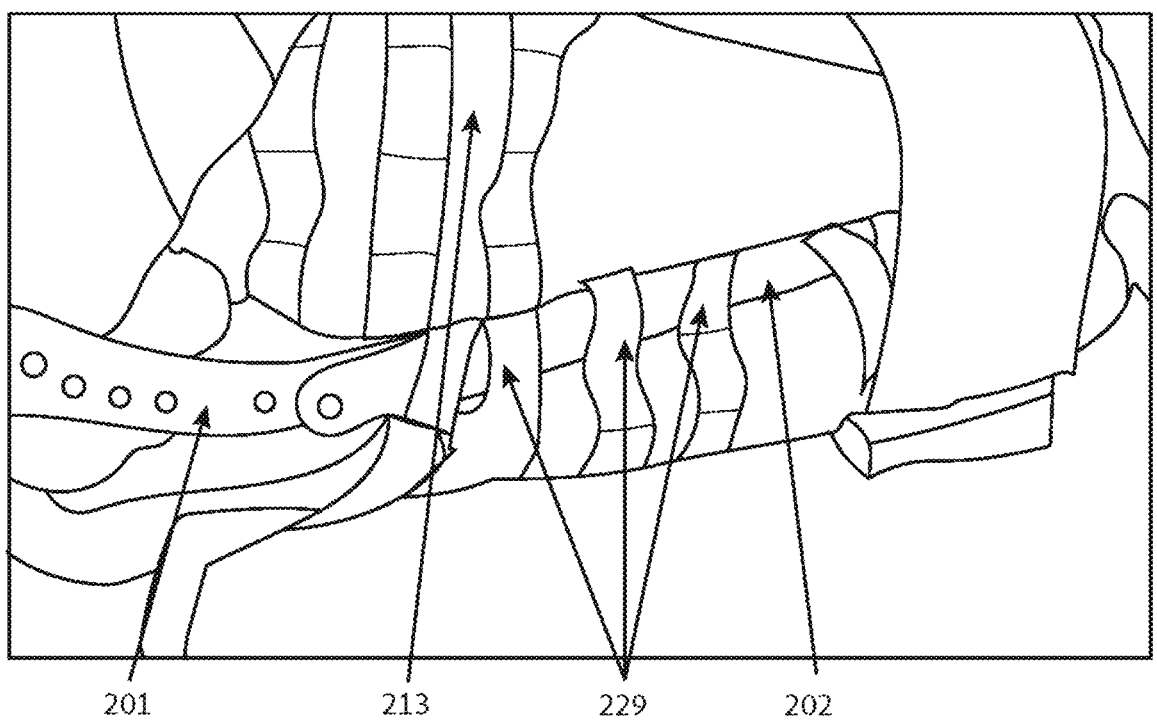
FIG. 2G depicts an illustrative system for a third attachment interface and a fourth attachment interface comprising a system of webbing in accordance with an embodiment.

Referring now to FIG. 2G, an illustration 200g of a system wherein the arm 201 and member 202 depicted in FIG. 2A are utilizing a system of webbing 229 to act as the housing to connect to the payload 213.

Figure 2H:
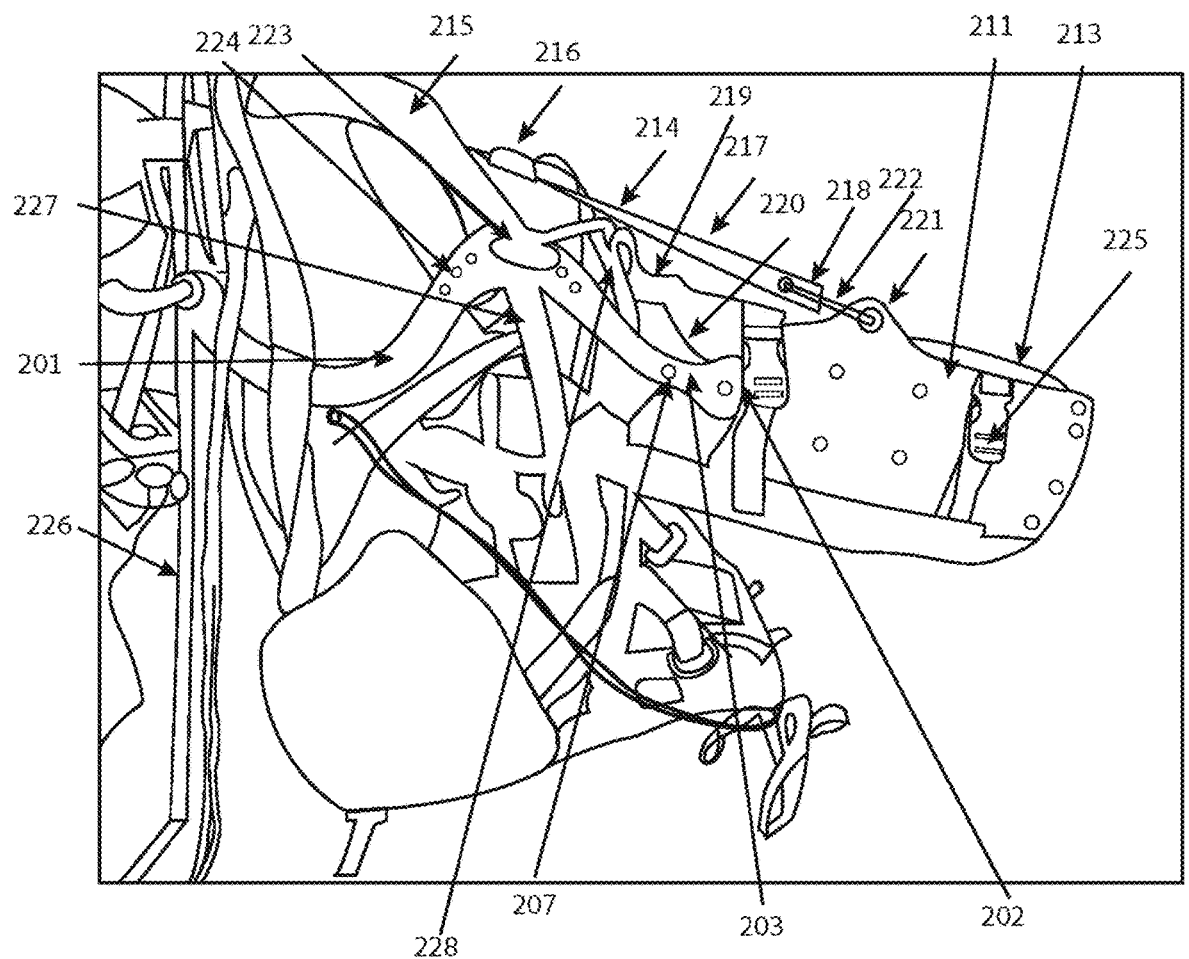
FIG. 2H depicts an illustrative system of an arm, a member, at least an attachment interface, a flight system, a payload, and an adaptive stabilizer device.

Referring now to FIG. 2H, an illustration 200h of a system wherein the adaptive stabilizer device comprises of a strap 214 connected to the flight system shoulder strap 215 through an adjustable buckle 216 that allows the positioning of the attachment interface 211 and payload 213 along the member 202. The strap 214 incorporates a releasable buckle 217 that permits easy attachment and removal of the attachment interface 211 and payload 213 system onto the member 202. The adaptive stabilizer device may also incorporate a quick release mechanism 218 that releases one or multiple straps 214 from the attachment interface 211 and payload 213 system. In some embodiments the quick release mechanism 218 includes a handle 219 attached to cables 220. When the handle 219 is pulled the cables 220 are retracted and removed from a loop 222 that passes through a grommet 221 on the attachment interface 211 and back to the quick release mechanism 218 allowing all straps 214 to disconnect from the attachment interface 211 and payload 213 system simultaneously.

In a non-limiting example, the arm 201 may include a feedthrough hole 223. Without limitation the feedthrough hole 223 may provide additional points for the user to pass cables 220 and or multiple straps 214 through. In another non-limiting example, the arm 201 may include a plurality of mounting holes 224. Without limitation, the plurality of mounting holes 224 on the arm 201 may be used to attach the arm 201 to the member 202. In an embodiment, the mounting holes 224 may be part of the existing arm 201 and may serve as attachment points for a canopy. In an embodiment, there are multiple holes to allow for shifting the attachment point forward or backward, enabling balance adjustments. In an embodiment, the mounting holes 224 may be utilized for mounting a payload device. In an embodiment, to accommodate both the canopy and the payload, the mounting holes 224 may be shared or replicated to secure both the canopy and a wing.

In another non-limiting example, the apparatus may include a fastener 225. In an embodiment, the fastener 225 may be used to secure the payload 213 closed and/or secure contents of the payload 213 within the payload 213. Without limitation, the fastener may include a buckle, a clasp, a latch, a snap, hook and loop, and the like. The fastener 225 may be positioned vertically and/or horizontally. Without limitation, the apparatus may include one or more fasteners 225. In an embodiment, the fastener 225 may be a strap. In an embodiment, the fastener 225 may hold the sleeve, which acts as the attachment interface 211 where the member 202 is inserted, to the payload 213. In an embodiment, the fastener 225 may be an existing feature and can be used to compress the payload 213 or a rucksack. In an embodiment, the fastener 225 may be used to keep the payload 213 closed.

Without limitation, the flight system may include an airframe 226. For example, the airframe 226 may include the structural framework of the flight system, which could include elements such as the fuselage, wings, and landing gear. In some embodiments, the airframe 226 may be made from lightweight materials such as aluminum alloys, carbon fiber composites, or titanium, depending on the design and intended use of the flight system. The airframe 226 may also incorporate mounting points for engines, control surfaces, or payloads 213 and may be configured to support both manned and unmanned flight operations. In a non-limiting example, the flight system may include a pilot harness 227. In a non-limiting example, the flight system may include a canopy rigging 228.

In some embodiments, the system includes an apparatus for a flight system. In some embodiments, the payload mounting system includes a first mounting device comprising a first end and a second end, a second mounting device comprising a first end and a second end, a first mating device, and a second mating device. In some embodiments, the first end of the first mounting device is configured to attach to the flight system and the second end of the first mounting device is configured to attach to the first mating device at a first attachment interface. In some embodiments, the first end of the second mounting device is configured to attach to the flight system and the second end of the second mounting device is configured to attach to the second mating device at a second attachment interface. each of the first mating device and the second mating device is configured to attach to a payload.

In some embodiments, each of the first mounting device and the second mounting device are attached to the flight system by one of pins, ratchets, bolts, straps, welds, adhesives, or clamps. In some embodiments, the system includes a plurality of spring configured to engage the pins, ratchets, bolts, straps, welds, adhesives, or clamps. In some embodiments, the plurality of springs are configured to adjust the friction between the first mounting device and the first mating device. In some embodiments, the springs are configured to adjust the friction between the second mounting device and the second mating device. In some embodiments, the plurality of springs are configured to maintain the position of first mating device and the first mounting device as the first mating device is attached to the first mounting device. In some embodiments, the plurality of springs are configured to maintain the position of second mating device and the second mounting device as the second mating device is attached to the second mounting device. In some embodiments, the plurality of springs are configured to aid in the separation of the first mating device and the first mounting device. In some embodiments, the plurality of springs are configured to aid in the separation of the second mating device and the second mounting device. In some embodiments, the plurality of springs are configured to aid in the adjustment of the position of the payload.

In some embodiments, each of the first mounting device and the second mounting device are comprised of one of aluminum, steel, iron, titanium, carbon fiber, a polymer, or a wood, or any other metal, polymer, composite, ceramic, or other structural material(s). In some embodiments, each of the first mounting device and the second mounting device comprise an outer layer. The outer layer is a lubricating material. In some embodiments, the lubricating material is a polymer liner.

In some embodiments, each of the first mating device and the second mating device are comprised of one of aluminum, steel, iron, titanium, carbon fiber, a polymer, or a wood, or any other metal, polymer, composite, ceramic, fabric, webbing, or other structural material(s). In some embodiments, each of the first mounting device and the second mounting device comprise an outer layer. In some embodiments, the outer layer is a lubricating material. In some embodiments, the lubricating material is a polymer liner.

In some embodiments, each of the plurality of springs are comprised of one of aluminum, steel, iron, titanium, carbon fiber, a polymer, or a wood, or any other metal, polymer, composite, ceramic, or other structural material(s). In some embodiments, each of the first mounting device and the second mounting device comprise an outer layer. In some embodiments, the outer layer is a lubricating material. In some embodiments, the lubricating material is a polymer liner.

In some embodiments, the attachments of each of the first mounting device and the second mounting device to the individual flying system is rigid. In some embodiments, the angle of the attachments of each of the first mounting device and the second mounting device to the individual flying system is configured to be adjustable. In some embodiments, each of the first mounting device and the second mounting device are attached to the flight system at one of the arms, a pilot harness, or an airframe. In some embodiments, each of the first mounting device and the second mounting device comprise a plurality of holes configured to allow the first mounting device and the second mounting device to the flight system. In some embodiments, each of the first mounting device and the second mounting device comprise a member. each of the first mating device and the second mating device comprise a housing.

In some embodiments, at least one of the first mounting device and the second mounting device comprise one or more of rollers, slides, hooks, clasps, clamps, buttons, clips, magnets, or hook and loops. In some embodiments, at least one of the first mating device and the second mating device comprise one or more of rollers, slides, hooks, clasps, clamps, buttons, clips, magnets, or hook and loops. In some embodiments, at least one of the first attachment interface and the second attachment interface comprise one or more of straps, ropes, cables, belts, clamps, over center cam clamps, ratchets, detents, rack and pinions, lead screws, ball screws, lever arm linkages, buttons, clips, hooks, hook and loops, or magnets. In some embodiments, the first attachment interface and the second attachment interface are configured to allow a user to control the position of the payload during flight. In some embodiments, the first attachment interface and the second attachment interface are configured to allow a user to control the position of the payload one the ground. The first attachment interface and the second attachment interface may be configured to adjust the and the fore/aft balance of the flight system.

In some embodiments, the system further includes at least one mate adjusting device configured to adjust the distance between the first mating device and the second mating device. This allows the user to attach the apparatus to payloads of various size. In some embodiments, the system further includes at least one mount adjusting device configured to adjust the distance between the first mating device and the second mating device. This allows the user to attach the apparatus to payloads of various sizes.

In some embodiments the system includes at least two straps attached to the flight system. In some embodiments, each of the at least two straps are attached to the flight system at one or more of an airframe, a pilot harness, and a canopy rigging. In some embodiments, each of the at least two straps is further attached to one of the first mounting device, the second mounting device, or the payload. In some embodiments, each of the at least two straps include a buckle. In some embodiments, each of the at least two straps includes an adjusting device. In some embodiments, the adjusting device is configured to adjust the length of the at least two straps. The length of each of the at least two straps may be adjusted to control the position of the payload and the fore/aft balance of the flight system. In some embodiments, the adjusting device is configured to control the position of the payload during flight.

Still referring to FIG. 2H, the apparatus may further include a release device configured to release the payload. In some embodiments, the release device may include at least two straps. In an embodiment, the release device may be configured to allow a user to release the payload from the apparatus. In some embodiments, the release device is configured to allow the user to release the payload from the apparatus during flight. In an embodiment, the release device may be designed to quickly and efficiently detach the payload from the apparatus. In an embodiment, the release device may be composed of straps equipped with quick-release buckles or clips that disengage with a single pull or push. In an embodiment, the release device may use ratcheting mechanisms or cam buckles that, when activated, loosen the straps holding the payload. Additionally and or alternatively, the release device may involve pins or detents that, when pulled, release the payload. In an embodiment, the release device may incorporate magnetic fasteners, spring-loaded latches, or a single-point release system that disengages multiple attachment points simultaneously. In an embodiment, the release device may enable easy pickup of the payload prior to takeoff, ensuring smooth preparation for flight. In an embodiment, the release device may provide for intentional airdrops during flight, such as delivering supplies, materials, or ordinance. In an embodiment, during a flight emergency, the release device may provide the user with the ability to quickly drop the payload to improve safety or balance. In an embodiment, after landing, the release device may facilitate unloading. In an embodiment, in the case of a water landing, the release device may ensure the payload can be detached swiftly to prevent any complications.

Figure 3:
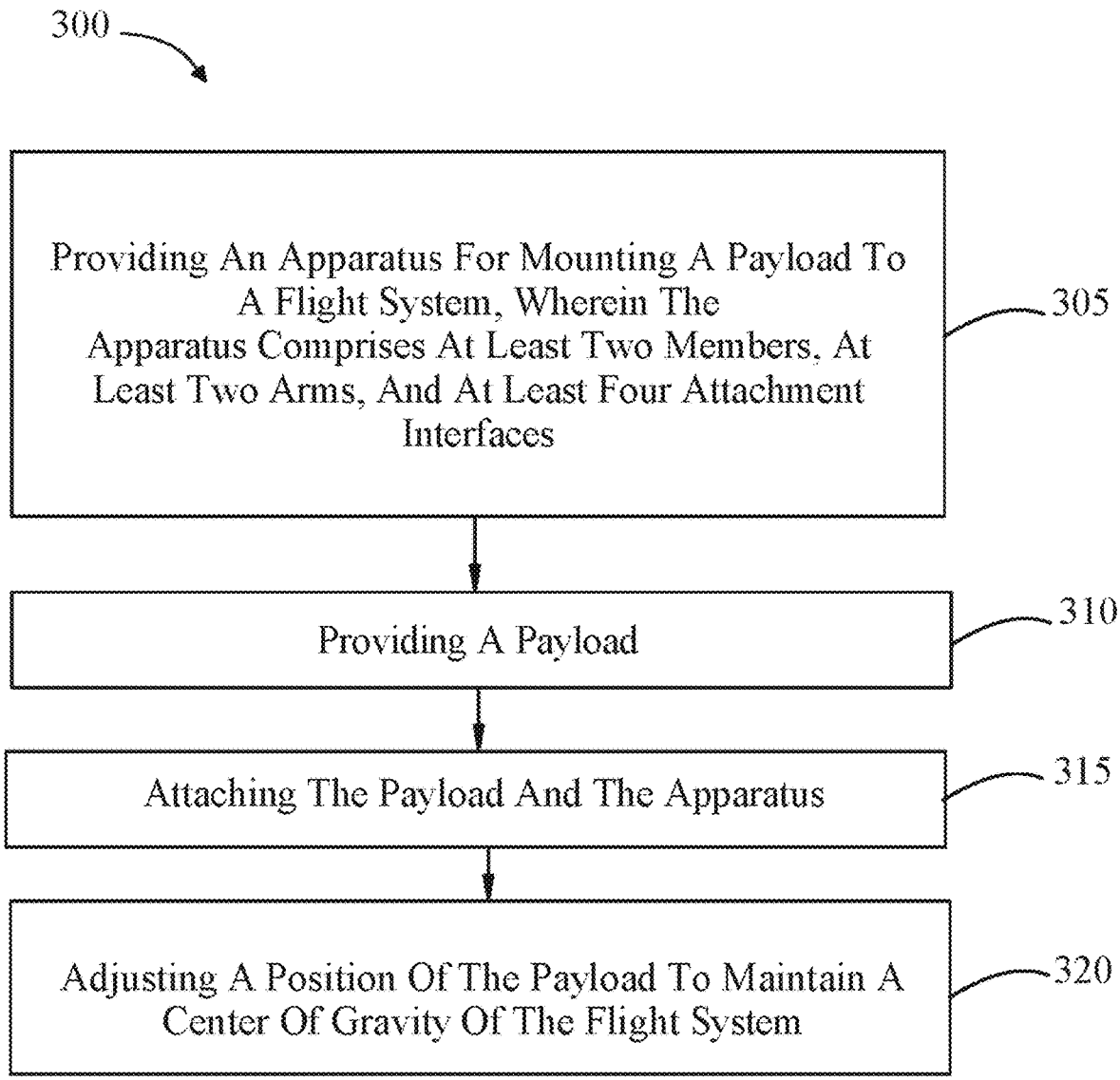
FIG. 3 depicts a method for mounting a payload to a flight system.

Referring now to FIG. 3, a flow diagram of an exemplary method 300 for mounting a payload to a flight system. At step 305, method 300 includes providing an apparatus for mounting a payload to a flight system, wherein the apparatus includes at least two members, at least two arms, at least four attachment interfaces, and an adaptive stabilizer device. In some embodiments, each of the at least two arms are attached to the flight system at one of an airframe, a pilot harness, or a canopy rigging. In some embodiments, each of the at least two arms are attached to one of the at least two members by at least two first attachment interfaces. In some embodiments, the payload includes at least two attachment interfaces. In some embodiments, each of the at least two members are attached to the payload by at least two second attachment interfaces. This may be implemented as described and with reference to FIGS. 1-2.

Still referring to FIG. 3, at step 310, method 300 includes providing a payload. This may be implemented as described and with reference to FIGS. 1-2.

Still referring to FIG. 3, at step 315, method 300 includes attaching the payload and the apparatus. In some embodiments, the payload and the apparatus are attached 315 using the at least two attachment interfaces and the at least two members. In some embodiments, the payload and the apparatus are attached 310 using one or more of straps, ropes, cables, belts, clamps, over center cam clamps, ratchets, detents, rack and pinions, lead screws, ball screws, lever arm linkages, buttons, clips, hooks, hook and loops, and magnets. This may be implemented as described and with reference to FIGS. 1-2.

Still referring to FIG. 3, at step 320, method 300 includes adjusting a position of the payload to maintain a center of gravity of the flight system. In some embodiments, the position of the payload is adjusted using the at least two first attachment interfaces to control the fore/aft balance of the flight system. In some embodiments, the method further includes adjusting the position of the payload using the at least two second attachment interfaces. In some embodiments, the position of the payload is adjusted using the at least two second attachment interfaces to control the fore/aft balance of the flight system. In some embodiments, each of the at least two straps comprise an adjustment device. In some embodiments, the position of the payload using the adjustment device. In some embodiments, the position of the payload is adjusted using the adjustment device to control the fore/aft balance of the flight system. This may be implemented as described and with reference to FIGS. 1-2.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for mounting a payload to a flight system, the apparatus comprising:
    a first member, attached directly or indirectly to the flight system, comprising a distal end and a proximal end, wherein the distal end of the first member is configured to removably attach at a first side of the payload at a first attachment interface;
    a second member, attached directly or indirectly to the flight system, comprising a distal end and a proximal end, wherein the distal end of the second member is configured to removably attach at a second side of the payload at a second attachment interface, wherein:
        the payload is distinct from a pilot of the flight system;
        the second side of the payload is opposite the first side of the payload;
        the first member and the second member are rigid; and
        the first member and the second member are configured to project at least partially forward along a flight direction from the flight system; and
    a first arm comprising a first end and a second end, wherein the first end of the first arm is configured to attach to the flight system and the second end of the first arm is configured to attach to the proximal end of a first member using a third attachment interface.

2. The apparatus of claim 1, wherein at least one of the first arm and the second arm is attached to the flight system at one or more of an airframe, a pilot harness, and a canopy rigging.

3. The apparatus of claim 1, wherein the third attachment interface comprises a first mounting device configured to attach to a first mating device and a fourth attachment interface comprises a second mounting device configured to attach to a second mating device.

4. The apparatus of claim 3, wherein at least one of the first mounting device, the second mounting device, the first mating device, and the second mating device comprise one or more of hooks, clasps, clamps, over center cam clamps, buttons, clips, magnets, hook and loops, rails, slides, and rollers.

5. The apparatus of claim 1, wherein at least one of the third attachment interface and a fourth attachment interface comprises an adjustable pivot point.

6. The apparatus of claim 5, wherein the adjustable pivot point comprises one or more of pins, clamps, ratchets, a vertical slide, multiple pivot points, and a linkage.

7. The apparatus of claim 1, wherein at least one of the first attachment interface and the second attachment interface comprise one or more guided structures.

8. The apparatus of claim 7, wherein the one or more guided structures comprise one or more of chamfers and bevels configured to:
    align the distal end of the first member with a first receptacle coupled to the payload;
    align the distal end of the second member with a second receptacle coupled to the payload;
    engage the distal end of the first member with the first receptacle coupled to the payload; and
    align the distal end of the second member with the second receptacle coupled to the payload.

9. The apparatus of claim 1, wherein at least one of the first attachment interface and the second attachment interface are configured to attach to the payload using one or more of sewing, clips, pockets, hook and loop, fasteners, straps, and magnets, wherein the payload comprises a box, case, container, bag, tray, frame, package, or other object.

10. The apparatus of claim 1, further comprising an adaptive stabilizer device attached to at least the payload and the flight system, wherein the adaptive stabilizer device is configured to:
    retain a position of the payload; and
    adjust the position of the payload relative to the flight system.

11. The apparatus of claim 10 wherein the adaptive stabilizer device comprises one of a ratcheting device, rails, slides, rollers, telescoping rods, linear bearings, adjustable attachment points, rack and pinions, linkages, scissor linkages, 4-bar linkages and clamps.

12. The apparatus of claim 10, wherein the adaptive stabilizer device comprises at least two components attached to the payload and the flight system at one or more of an airframe, a pilot harness, and a canopy rigging.

13. The apparatus of claim 1, wherein the apparatus further comprises a release device configured to release the payload.

14. The apparatus of claim 1, wherein a position of at least the first member in relation to the first arm is configured to be adjusted using a plurality of arm holes on the first arm and a member hole on the first member.

15. A method of mounting a payload to a flight system, the method comprising:
    providing an apparatus for mounting a payload to a flight system, wherein the apparatus comprises at least two members and at least two attachment interfaces;
    attaching a first end of a first arm to the flight system and attaching a second end of the first arm to a proximal end of a first member using a third attachment interface; and
    attaching a first end of a second arm to the flight system and attaching a second end of the second arm to a proximal end of a second member using a fourth attachment interface, wherein the first arm and the second arm are configured to project at least partially forward along a flight direction from the flight system;
    providing a payload wherein the payload is distinct from a pilot of the flight system;
    removably attaching, using the at least two attachment interfaces, the payload and the at least two members of the apparatus; and
    adjusting, using the apparatus, a position of the payload relative to the flight system.

16. The method of claim 15, wherein attaching the payload and the at least two members of the apparatus comprises:
attaching, using a first attachment interface, a distal end of a first member of the at least two members to the payload; and
attaching, using a second attachment interface, a distal end of a second member of the at least two members to the payload.

17. The method of claim 15, wherein adjusting the position of the payload comprises adjusting the position of the payload on one or more of translational axes and rotational axes to maintain a center of gravity during flight.

18. An apparatus for mounting a payload to a flight system, the apparatus comprising:
a first member, attached directly or indirectly to the flight system, comprising a distal end and a proximal end, wherein the distal end of the first member is configured to removably attach at a payload at a first attachment interface, wherein:
the payload is distinct from a pilot of the flight system
the first member is rigid; and
each of the first member is configured to project at least partially forward along a flight direction from the flight system; and
a first arm comprising a first end and a second end, wherein the first end of the first arm is configured to attach to the flight system and the second end of the first arm is configured to attach to the proximal end of the first member using a second attachment interface, wherein the first arm is attached to the flight system at one or more of an airframe, a pilot harness, and a canopy rigging.

19. The apparatus of claim 18, wherein at least one of the second attachment interface comprises an adjustable pivot point.

20. The apparatus of claim 18, wherein at least one of the first attachment interface and the second attachment interface comprise one or more guided structures.

21. The apparatus of claim 1, further comprising an adjusting device configured to adjust a positioning of the first attachment interface and the payload along the first member while maintaining a center of gravity of the flight system.

22. The method of claim 15, wherein adjusting the apparatus comprises using an adjusting device configured to adjust a positioning of a first attachment interface of at least two attachment interfaces and the payload along a first member of the at least two members while maintaining a center of gravity of the flight system.

23. The apparatus of claim 18, further comprising an adjusting device attached to at least the payload and the flight system configured to achieve and maintain a center of gravity.

24. An apparatus for mounting a payload to a flight system, the apparatus comprising:
a first member, attached directly or indirectly to the flight system, comprising a distal end and a proximal end, wherein the distal end of the first member is configured to removably attach at a first side of the payload at a first attachment interface;
a second member, attached directly or indirectly to the flight system, comprising a distal end and a proximal end, wherein the distal end of the second member is configured to removably attach at a second side of the payload at a second attachment interface, wherein:
the payload is distinct from a pilot of the flight system;
the second side of the payload is opposite the first side of the payload;
the first member and the second member are rigid; and
the first member and the second member are configured to project at least partially forward along a flight direction from the flight system;
wherein at least one of the first attachment interface and the second attachment interface comprise one or more guided structures comprising one or more of chamfers and bevels configured to:
align the distal end of the first member with a first receptacle coupled to the payload;
align the distal end of the second member with a second receptacle coupled to the payload;
engage the distal end of the first member with the first receptacle coupled to the payload; and
align the distal end of the second member with the second receptacle coupled to the payload;
a first arm comprising a first end and a second end, wherein the first end of the first arm is configured to attach to the flight system and the second end of the first arm is configured to attach to the proximal end of a first member using a third attachment interface.

25. An apparatus for mounting a payload to a flight system, the apparatus comprising:
a first member, attached directly or indirectly to the flight system, comprising a distal end and a proximal end, wherein the distal end of the first member is configured to removably attach at a first side of the payload at a first attachment interface;
a second member, attached directly or indirectly to the flight system, comprising a distal end and a proximal end, wherein the distal end of the second member is configured to removably attach at a second side of the payload at a second attachment interface, wherein:
the payload is distinct from a pilot of the flight system;
the second side of the payload is opposite the first side of the payload;
the first member and the second member are rigid; and
the first member and the second member are configured to project at least partially forward along a flight direction from the flight system;
a first arm comprising a first end and a second end, wherein the first end of the first arm is configured to attach to the flight system and the second end of the first arm is configured to attach to the proximal end of a first member using a third attachment interface; and
an adaptive stabilizer device attached to at least the payload and the flight system, wherein the adaptive stabilizer device is configured to:
retain a position of the payload; and
adjust the position of the payload relative to the flight system, wherein the adaptive stabilizer device comprises at least two components attached to the payload and the flight system at one or more of an airframe, a pilot harness, and a canopy rigging.

* * * * *